United States Patent [19]

Davis

[11] Patent Number: 4,457,501

[45] Date of Patent: Jul. 3, 1984

[54] ADJUSTABLE SPRING SEAT

[75] Inventor: Alan R. Davis, Plainwell, Mich.

[73] Assignee: Eaton Corporation, Cleveland, Ohio

[21] Appl. No.: 404,250

[22] Filed: Aug. 2, 1982

[51] Int. Cl.$^3$ ............................................. F16F 1/12
[52] U.S. Cl. ................................... 267/177; 74/526; 74/527; 267/175
[58] Field of Search ............... 267/175, 177; 251/337; 411/536, 535; 192/110, 110 R; 74/527, 526

[56] References Cited

U.S. PATENT DOCUMENTS

| | | | |
|---|---|---|---|
| 3,013,790 | 12/1961 | Anderson et al. | 267/175 |
| 3,572,219 | 3/1971 | Murrell et al. | 267/177 X |
| 3,587,355 | 6/1971 | Schaefer | 74/868 |
| 3,618,927 | 11/1971 | Nicholls | 267/177 X |
| 3,984,119 | 10/1976 | Okazima | 267/177 X |

Primary Examiner—Bruce H. Stoner, Jr.
Assistant Examiner—Michael P. Gilday
Attorney, Agent, or Firm—C. H. Grace; H. D. Gordon

[57] ABSTRACT

An adjustable spring stop assembly (10) for a spring (S) received within a bore (B) is provided. The adjustable spring stop assembly comprises a washer member (12) and an adjustment member (14). The washer member is axially fixable within the bore and is provided with a centrally located aperture (16) and a plurality of radially extending, radially aligned slot pairs of different diametrical lengths (18—18, 20—20, 22—22, 24—24, and 26—26). The adjustment member is provided with a pair of axially extending and inwardly tapering ear portions (34) which may be received within any selected one of the slot pairs. The adjustment member is provided with a fitting (40) which is accessible from the exterior of the bore through the centrally located aperture in the washer member for incrementally selectively varying the separation (44) of a surface (32) on the adjustment member from the washer member.

9 Claims, 6 Drawing Figures

ADJUSTABLE SPRING SEAT

BACKGROUND OF THE INVENTION

1. Field of the Invention

The present invention relates to adjustable spring stops, and in particular, to adjustable spring stops for valves incorporating loading spring means and means for varying, in discrete steps, the spring loading force, as necessary, to effect desired adjustments of the valve operating setting.

2. Description of the Prior Art

Valves, such as pressure regulating valves, utilizing spring loading or biasing means for biasing a valve member, such as a valve spool or the like, are well known in the prior art. Adjustment mechanisms for such valves, whereby the spring loading or biasing force may be varied as necessary to effect a desired adjustment of the valve setting, are well known in the prior art. Examples of such valves, and the adjustment mechanism therefore, may be seen by reference to U.S. Pat. Nos. 3,013,790; 3,587,355; 3,618,927; and 3,572,219, all of which are hereby incorporated by reference.

While the prior art adjustable spring seat devices were functionally satisfactory as they allowed selective adjustments of the spring loading or biasing force of the springs seated thereby, they were not totally satisfactory as the prior art devices were often complicated and/or expensive to produce, required a complicated operation to effect the spring bias adjustment and/or were not suitable for direct replacement of a standard washer-type, non-adjustable spring seat. By way of example, the prior art devices often require relatively complex cam members which mate with other cam members and/or pins, require threadably engaged members, or the like. Additionally, the prior art devices are typically relatively specialized structures which are not suitable for relatively easy replacement of standard washer-type, non-adjustable spring seats.

SUMMARY OF THE INVENTION

In accordance with the present invention, the drawbacks of the prior art are overcome or minimized by the provision of an incrementally adjustable spring stop, or spring seat, for varying, in discrete steps, the spring bias force of the spring seated thereby. The adjustable stop of the present invention eliminates the need for relatively complex cam surfaces and mating cam surfaces or pins and/or the requirement for threadably engaged members. The adjustable spring stop of the present invention permits quick and easy adjustment of the spring load from the exterior of the bore in which the spring and spring biased member is received and provides positive and verifiable positioning and retention of the adjustable stop in any one of a discrete number of adjustment positions. The adjustable spring seat of the present invention is suitable for simple and quick replacement of standard washer-type, non-adjustable spring stops.

The above is accomplished by providing an adjustable spring stop comprising two members which may be relatively simple and inexpensively produced metal stampings or the like. One member of the assembly is a generally washer-shaped member which will be axially retained in the bore in which the biasing spring and/or the member biased by the spring are received. The washer member is provided with a central aperture and a plurality of radially extending slots of various lengths. The other member of the assembly is a positioning member comprising a base portion against which one end of the biasing spring will seat and a pair of axially extending inwardly tapering ear portions. The ear portions are of a width to be received within the slots in the washer portion. The ear portions are designed to be received in any selected one of the variable length slots to selectively vary the axial spacing of the base portion from the axially fixed washer portion and thereby to vary the preload on the biasing spring. A fitting, such as a screwdriver slot or the like, is provided in the base portion of the positioning member for selective rotation of the positioning member relative to the washer and the fitting is accessible through the generally centrally located aperture in the washer.

Accordingly, it is an object of the present invention to provide a new and improved adjustable spring stop assembly.

Another object of the present invention is to provide a relatively inexpensively produced adjustable spring stop assembly for varying, in discrete steps, the spring load or biasing force provided by a spring received in an open-ended bore.

These and other objects and advantages of the present invention will become fully apparent from the following detailed description of the preferred embodiment of the invention when considered in conjunction with the accompanying drawings.

Figure 1A:
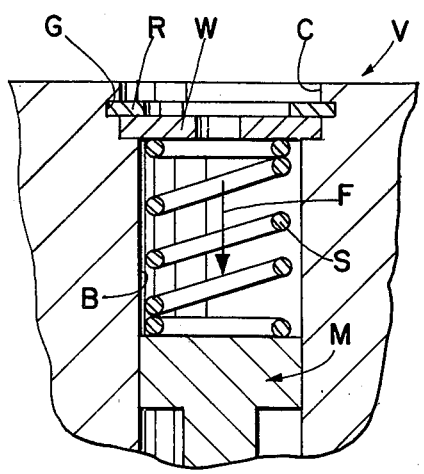
FIG. 1A is a partial sectional view, similar to FIG. 1, of a valve utilizing a prior art nonadjustable washer-type spring stop.

Certain terminology will be used in the following description for convenience and reference only and will not be limiting. The words "upwardly", "downwardly", "rightwardly", and "leftwardly" will designate directions in the drawings to which reference is made. The words "inwardly" and "outwardly" will refer to directions toward and away from, respectively, the geometric center of the device and designated part thereof. Said terminology will include the words above specifically mentioned, derivitives thereof, and words of similar import.

FIG. 1A illustrates a portion of a valve V in which a spring biased valve member, such as a valve spool M, is slidably received within bore B. The biasing spring S is non-adjustably retained to provide a non-adjustable biasing force on member M by prior art washer-type spring seat W which is axially retained in the open ended bore B by means of an internal snap ring R or the like. Snap ring R is received within an appropriate annular grove G provided in the enlarged diameter or counterbored portion C of bore B.

As is well known, the magnitude of the axial spring load, or spring bias, applied to valve spool M in the axial direction of arrow F by coil compression spring S is a function of the spring rate characteristics of spring S and the axial separation of washer W from the upper surface of valve spool M.

Figure 1:
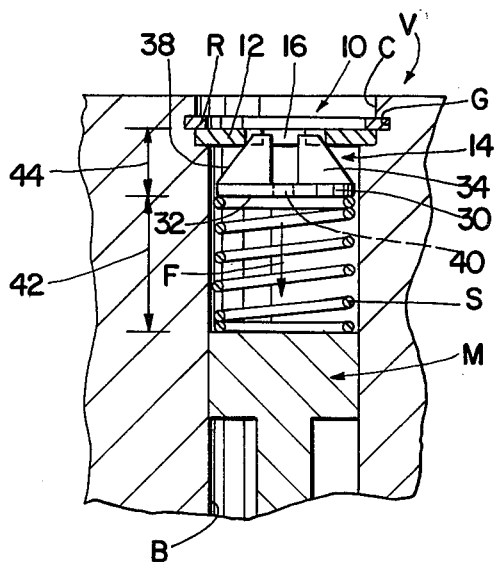
FIG. 1 is a partial sectional view of a valve comprising a spring biased valve member and the adjustable spring stop assembly of the present invention.

The adjustable spring stop assembly 10 of the present invention, as utilized with the valve V, to vary, in discrete steps, the spring loading force on valve member M applied by compression spring S may be seen by reference to FIG. 1. It may also be seen, that the adjustable spring stop assembly 10 of the present invention may replace the non-adjustable spring stop washer W shown in FIG. 1A quickly and simply and without the requirement of further modification (other than possible use of a different spring S) to valve V.

Briefly, valve member M is slidably received within an open ended bore B and is spring biased in the axial direction of arrow F by means of compression spring S. The magnitude of the spring bias, or spring load, upon member M may be selectively varied in incremental or discrete steps by utilizing adjustable spring stop assembly 10 which will be described in greater detail below. It is understood that while the adjustable spring stop assembly 10 of the present invention is illustrated as utilized to vary the spring force on a spring biased valve member which is slidably received within a bore, the assembly 10 of the present invention may be utilized to vary the spring bias applied by any spring received at least partially within a bore.

Adjustable spring stop 10 is a two piece assembly comprising a washer member 12 and an adjustment member 14. Preferably, both members, 12 and 14, are sheet metal stampings although either or both of the members may be of molded plastic or any other suitable material.

Figure 2:
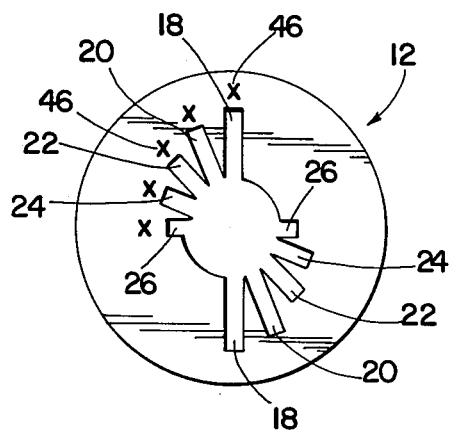
FIG. 2 is a top view of the washer member of the adjustable spring stop assembly of the present invention.
Figure 3:
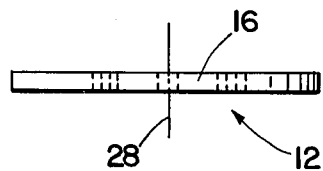
FIG. 3 is a side view of the washer member of FIG. 2.

Washer member 12, as may be seen by reference to FIGS. 2 and 3, is a generally flat annular disk shaped member designed to be axially retained in the counterbore portion C of bore B by means of a snap ring R received in a suitable annular groove G provided in the enlarged diameter or counterbore portion C at the opening to bore B. It may be seen that assembly of washer member 12 of adjustable spring seat assembly 10 to bore B is accomplished in the same manner as assembly of prior art washer W to bore B and requires no modification of the valve V assembly. Washer member 12 is provided with a centrally located aperture 16 and a plurality of pairs of radially extending slots 18—18, 20—20, 22—22, 24—24, and 26—26. Each of the radially aligned, radially extending pairs of slots is of a different diameter measured from the axis 28 of the disk shaped washer member 12.

Figure 4:
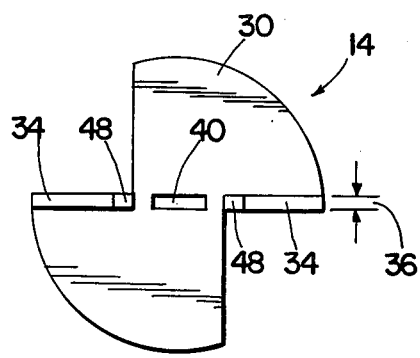
FIG. 4 is a top view of the adjustment member of the adjustable spring stop of the present invention.
Figure 5:
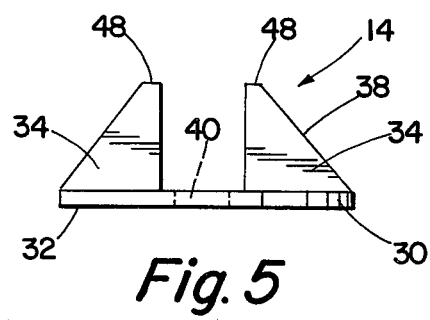
FIG. 5 is a side view of the adjustment member of FIG. 4.

Adjustment member 14, which may be seen by reference to FIGS. 4 and 5, is a one piece member having a generally transversely extending base portion 30, the lower surface 32 of which is designed to seat spring S, and a pair of axially upwardly and inwardly tapering ear portions 34 which are preferably formed from sheared portions of the base 30 which are bent upwardly. Each ear portion 34 is of a thickness 36 generally equal to the thickness of the radially aligned pairs of slots 18—18, 20—20, 22—22, 24—24, and 26—26. The tapered surfaces 38 of the ear portions 34 are separated by a distance, measured parallel to surface 32, which decreases with increasing axial distance from surface 32 and which is the range of at least the greatest diameter of radially aligned slots to the smallest diameter of radially aligned slots. Adjustment member 14 is provided with a fitting 40, such as a slot for receipt of the blade of a screwdriver.

As is known, the magnitude of spring load or bias applied to member M by spring S is a function of the axial separation 42 between surface 32 and the top surface of member M. To adjust the magnitude of this spring bias, the axial separation 44 between surface 32 and snap ring R may be varied. Adjustable spring stop assembly 10 provides an easily accessible device for positively adjusting axial separation 44 and maintaining said separation from the exterior of the valve V by the use of commonly available tools and without requiring disassembly of the valve V.

Adjustment member 14 is rotationally positioned so that the ear portions 34 thereof are received within a selected one of the radially aligned slot pairs provided in washer member 12. Depending upon the slot pair selected, the outer taper 38 of the ear portions 34 will be engaged by the radially outer ends of the selected slot pair at different positions along the tapered surfaces 38. The slot pairs may be provided with indicia marks such as are illustrated at 46. To adjust the spring load on member M, a screwdriver or the like is inserted from the open end of bore B through aperture 16 in washer member 12 and into slot 40 of adjustment member 14. The adjustment member 14 is then urged downwardly against the bias of spring S until the tops 48 of the ear portions clear the washer portion 12 and then the adjustment member 14 may be rotated until the ear portions 34 are aligned with the selected radially aligned slot pair in the washer member 12. The ear portions are then permitted to enter the selected radially aligned slot pair under the bias of spring S. Spring S will retain the assembly 10 in the selected position.

Of course, three or more equally circumferentially spaced ear portions 34 and a corresponding number of equally circumferentially spaced slots of each radial length may be provided in washer member 12. It may thus be seen that a relatively simple and inexpensive adjustable spring stop assembly has been provided which may be substituted for a standard non-adjustable washer type spring stop without requiring extensive modification of the device in which the spring stop is received and which permits easy and positive incremental adjustment of the spring load applied by the spring seated thereby.

While one preferred embodiment of the invention has been described and illustrated by way of example in the foregoing description, many modifications and changes in detail are possible without departing from the spirit and the scope of the invention as here and after the claims.

I claim:

1. An adjustable spring stop assembly for a coil spring received within a bore, said assembly comprising:

a generally flat disk shaped washer member axially fixed in said bore, said washer member having a generally centrally located aperture therethrough and a plurality of radially extending, radially aligned slot pairs formed therethrough, each of said slot pairs of a different diametrical length and of a generally equal width; and a one piece adjustment member having a generally flat, partially disk shaped base portion and a pair of ear portions extending axially from one side of said base portion, the thickness of said ear portions being equal to or less than the width of said slots, the radially outer surfaces of said ear portions tapering radially inwardly with increased distance from said base portion, said ear portions receivable in any selected one of said slot pairs, the maximum transverse separation of said radially outer surfaces measured on a plane normal to the axis of said bore being at least equal to the diameter of the longest slot pair, the minimum transverse separation of said radially outer surfaces, measured on a plane normal to the axis of said bore, being less than the diameter of the shortest slot pair, the other surface of said base portion adapted to seat one end of said spring.

2. The adjustable spring stop assembly of claim 1 wherein said adjustment member is provided with a fitting on said one side of said base portion, said fitting adapted for receipt of a tool for axial displacement and rotation of said adjustment member.

3. The adjustable spring stop assembly of claim 2 wherein said fitting is accessible from the exterior of said bore through said centrally located aperture in said washer member.

4. The adjustable spring stop assembly of claims 2 or 3 wherein said fitting comprises a slot for the receipt of a screwdriver blade.

5. The adjustable spring stop assembly of claims 2 or 3 wherein said washer member and said adjustment member are one-piece metalic stampings.

6. The adjustable spring stop assembly of claim 5 wherein said ear portions comprise sheared sections of said base portions bent at substantially right angles to said base portions.

7. An adjustable spring stop assembly for a coil spring received within a bore, said assembly comprising:
a generally flat disk shaped washer member axially fixed in said bore, said washer member having a generally centrally located aperture therethrough and a plurality of radially extending slot sets formed therethrough, each slot set comprising a plurality of equally circumferentially spaced, equal radial length, radially extending slots, the slots of each slot set of a different radial length than the slots of the other slot sets, all of said slots of a generally equal width; and
a one piece adjustment member having a generally flat, partially disk shaped base portion and a set of ear portions extending axially from one side of said base portion, the thickness of said ear portions being equal to or less than the width of said slots, the radially outer surfaces of said ear portions tapering radially inwardly with increased distance from said base portion, said ear portions receivable in any selected one of said slot sets, the maximum diameter defined by said radially outer surfaces measure on a plane normal to the axis of said bore being at least equal to the diameter defined by the longest slot set, the minimum diameter defined by said radially outer surfaces, measured on a plane normal to the axis of said bore, being less than the diameter defined by the shortest slot pair, the other surface of said base portion adapted to seat one end of said spring, said adjustment member provided with a fitting on said one side of said base portion, said fitting adapted for receipt of a tool for axial displacement and rotation of said adjustment member.

8. The adjustable spring stop assembly of claim 7 wherein said fitting is accessible from the exterior of said bore through said centrally located aperture in said washer member.

9. The adjustable spring stop assembly of claim 8 wherein said ear portions comprise sheared sections of said base portions bent at substantially right angles to said base portions.

* * * * *